_United States Patent_ [19]

Lehmann

[11] 4,214,354
[45] Jul. 29, 1980

[54] CONTROLLED DEFLECTION ROLL

[75] Inventor: Rolf Lehmann, Rudolfstetten, Switzerland

[73] Assignee: Escher Wyss Limited, Zurich, Switzerland

[21] Appl. No.: 51,635

[22] Filed: Jun. 25, 1979

[30] Foreign Application Priority Data

Jul. 11, 1978 [CH] Switzerland ............... 7514/78

[51] Int. Cl.² ............................................. B21B 21/02
[52] U.S. Cl. ................................................. 29/116 AD
[58] Field of Search ................... 29/113 AD, 116 AD

[56] References Cited

U.S. PATENT DOCUMENTS

| | | | |
|---|---|---|---|
| 3,802,044 | 8/1974 | Spillmann | 29/116 AD X |
| 3,846,883 | 11/1974 | Biondetti | 29/116 AD |
| 3,997,953 | 12/1976 | Christ et al. | 29/116 AD |
| 4,058,878 | 11/1977 | Lehmann | 29/116 AD |
| 4,114,959 | 9/1978 | Christ | 29/116 AD X |

_Primary Examiner_—Wayne L. Shedd
_Attorney, Agent, or Firm_—Werner W. Kleeman

[57] ABSTRACT

A controlled deflection roll having a stationary roll core or support and a roll shell mounted to be rotatable about the stationary roll support. The roll shell is supported upon hydrostatic pressure or support elements, each of which possesses a number of bearing pockets flow connected by means of throttle channels with a pressure chamber. The pressure elements are in the form of plates dispositioned in the intermediate space between the inner surface of the roll shell and the outer surface of the stationary roll support or core. This stationary roll support can have a substantially cylindrical or planar outer surface at the location where it is engaged by the pressure element. The pressure element can be retained in position by pins secured at the stationary roll support or core, these pins engaging with clearance or play into recesses of the related pressure element. The pressure element also can take the form of an elongate strip or ledge having a number of seals bounding separate pressure chambers.

8 Claims, 8 Drawing Figures

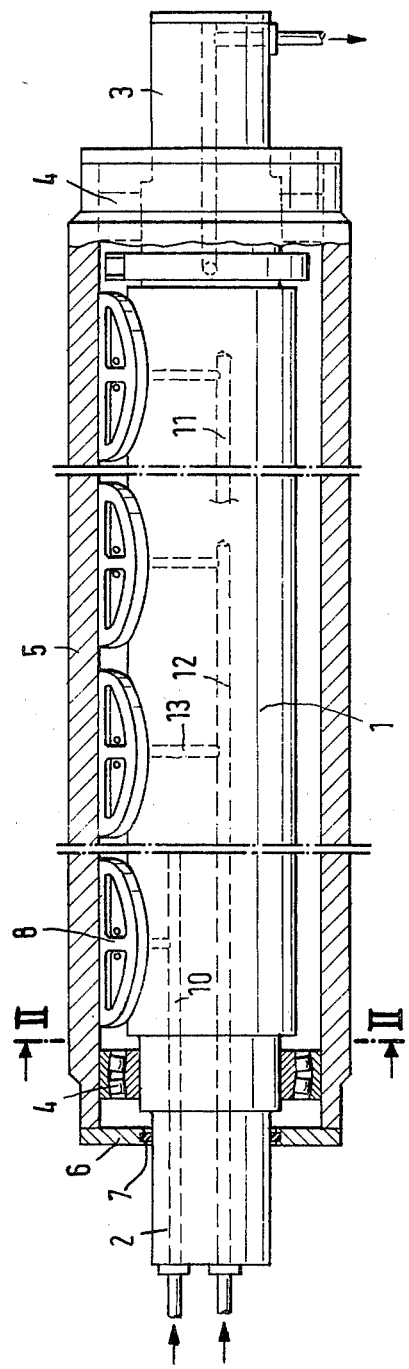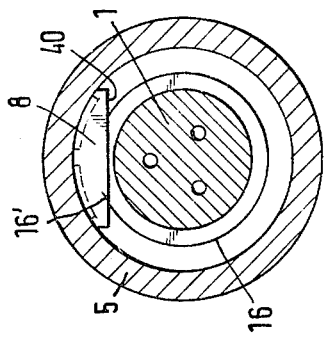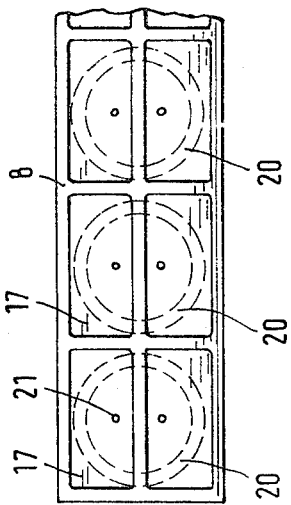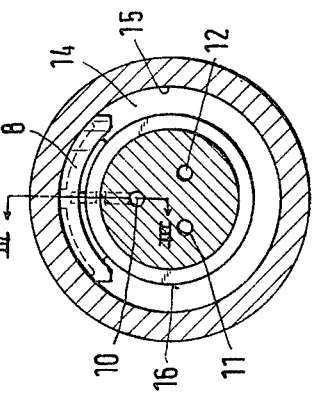

CONTROLLED DEFLECTION ROLL

BACKGROUND OF THE INVENTION

The present invention relates to a new and improved construction of controlled deflection roll of the type comprising a stationary roll support or core and a substantially tubular-shaped roll shell rotatable about such stationary roll support.

In particular, the controlled deflection roll of the present invention—also sometimes referred to in the art as rolls with bending or sag compensation—has the ends of the tubular-shaped roll shell rotatably mounted at the stationary roll support or core. At least one hydrostatic support or pressure element is arranged between the stationary roll support and the roll shell, this hydrostatic support element being guided at the roll support and having a contact surface upon which slidingly bears the inner surface of the roll shell. Between the roll support and the support element there is arranged a hydraulic pressure chamber connected with a suitable source of hydraulic pressurized fluid medium. The contact surface of the hydrostatic support element is provided with a number of hydrostatic bearing pockets which are connected by means of throttle channels with the pressure chamber.

A controlled deflection roll of this type is known to the art, for instance from U.S. Pat. No. 3,802,044, granted Apr. 9, 1974. With this state-of-the-art controlled deflection roll the hydrostatic support or pressure elements are configured as pistons or plungers, wherein the pressure chamber is in the form of a cylinder which is formed either at the roll support, or, in the event that the pressure or support element has the configuration of a plunger, then at the latter itself. Controlled deflection rolls constructed in this manner permit large strokes or displacement movements of the pressure or support elements, so that there can be attained large bending-through or deflection of the roll support and large contact forces. When the cylinder bores are formed at the roll support or core, then such constitute a weakening of such roll support. Cylinder chambers formed at the pressure or support elements equally cause weakening of the roll support, since its cross-sectional area must be selected to be correspondingly smaller to provide space for the pressure or support elements.

On the other hand, there are certain fields of application where the controlled deflection roll does not require any large displacement movement or stroke of the pressure or support elements, but at the same time, however, the roll support must be rigid as possible and also inexpensive.

SUMMARY OF THE INVENTION

Therefore, with the foregoing in mind, it is a primary object of the present invention to provide a new and improved construction of controlled deflection roll for such type fields of application, wherein the roll support or core is as simple as possible in construction, inexpensive and nonetheless rigid, and also the pressure or support element or elements can be designed to be appreciably simpler then heretofore possible.

Yet a further significant object of the present invention aims at the provision of a new and improved construction of controlled deflection roll, particularly suitable for use where the pressure elements are not required to perform large strokes or operative movements and where the roll support is required to be very rigid.

In keeping with the immediately preceding object, it is a further objective of the invention to provide a novel construction of controlled deflection roll fulfilling these requirements, and furthermore, which is relatively simple in design, extremely reliable in operation, not readily subject to breakdown or malfunction, economical to manufacture, and requires a minimum of maintenance and servicing.

Now in order to implement these and still further objects of the invention, which will become more readily apparent as the description proceeds, the controlled deflection roll of the present development is manifested by the features that, the pressure or support element has the form of a plate arranged with play in an intermediate space between the inner surface of the roll shell and the outer surface of the stationary roll support. The pressure chamber is bounded by the outer surface of the roll support, a surface of the pressure element confronting the outer surface of the roll support and a seal secured at the pressure element.

German Pat. No. 2,655,893 discloses a controlled deflection roll wherein disk-shaped shoes are arranged in the intermediate space between a roll support and a roll shell. However, the slide shoes do not afford a hydrostatic power transmission and bearing arrangement, rather constitute a type of seal for hydraulic pressurized fluid medium which is effective directly between the roll shell and the roll support. With this construction there is caused wear of the sealing surface which is pressed, by the hydraulic force, against the roll shell, with corresponding frictional losses during operation. To start rotation of the controlled deflection roll from standstill requires a considerable starting torque. Additionally, stringent demands are placed upon the quality of the inner surface of the roll shell.

With the controlled deflection roll, constructed according to the invention, the stationary roll support or core can have, at the location of each pressure or support element, an essentially cylindrical outer surface which is coaxially arranged with respect to the roll shell. In this case, the roll support can have a cross-section with the largest moment of inertia, and thus, in turn, can have optimum rigidity.

However, the roll support can also be provided, at the location of each pressure element, with a planar flat or beveled outer surface. In such case, the moment of inertia of the cross-section of the roll support is slightly reduced, however the pressure element can be constructed appreciably more simply, since its surface, confronting the roll support, can be flat.

Preferably, the seal or seal means can be a lip seal inserted into a recess of the pressure or support element. Such type seal is associated with the advantage that it enables the performance of displacement strokes of the pressure element in relation to the roll support which are greater than is possible with other types of seals, for instance O-rings. However, it is to be expressly understood that also such type O-ring seals can be used in certain instances.

The pressure element can be retained at the roll support by means of at least two pins or equivalent structure, secured at the roll support and engaging with play in recesses of the pressure element. In this way there is obtained a fixation of the pressure element at the roll support through the use of means which do not weaken or significantly lower the strength of the roll support in any way. The bore needed at the roll support for receiving the pin is filled by such pin, so that the compressive forces, resulting from the bending action, can be transmitted without hinderance to the location of the pin.

However, the pressure element also can contain a protruding lip confronting the roll support. Against this protruding lip or rib there bears the seal. The protruding lip engages into a groove formed in the surface of the roll support. Such type construction is of use in those cases where there is not permissible any reduction in strength of the roll support, but on the other hand there is required a somewhat larger stroke or displacement of the pressure element.

According to an extremely advantageous constructional manifestation of the invention, the pressure or support element can have the shape of an elongate strip or ledge, extending in the axial direction of the roll support. This elongate strip is provided with a plurality of seals bounding mutually separate pressure chambers. With this design there is insured for a particularly uniform contact pressure.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a partial sectional and partial front elevational view of a first exemplary embodiment of controlled deflection roll according to the invention;

FIG. 2 is a cross-sectional view of the controlled deflection roll of FIG. 1, taken substantially along the line II—II thereof;

FIG. 7 is a view, similar to FIGS. 4 and 6, of another construction of pressure or support element; and FIG. 8 is a sectional view, corresponding to the showing of FIG. 2, of a further embodiment of controlled deflection roll and its pressure or support element.

DETAILED DESCRIPTION OF THE PREFERRED EMBODIMENTS

Figure 3:
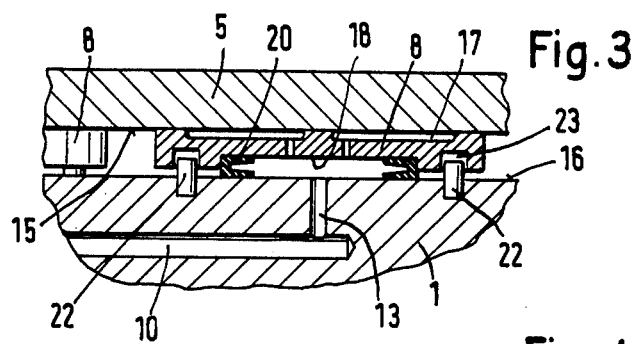
FIG. 3 is an axial partial sectional view, on an enlarged scale, taken substantially along the line III—III of FIG. 2.

Describing now the drawings, it is to be understood that only enough of the construction of the controlled deflection roll has been shown therein to enable those skilled in the art to readily understand the underlying principles and concepts of the invention. In the exemplary embodiment of controlled deflection roll shown in FIGS. 1 to 4, it will be seen that the same comprises a stationary roll support or core 1 having journals 2 and 3 which are intended, as is well known in this technology, to be supported in a frame arrangement of a rolling mill or press or a similar type of machine. A substantially tubular-shaped roll shell 5 is rotatably mounted in suitable anti-friction bearings, such as the roller bearings 4, at the roll support or core 1. The not particularly referenced opposed ends of the roll shell 5 are closed by end closure plates 6 having seals 7. Between the stationary roll support 1 and the rotatable roll shell 5 there are arranged hydrostatic pressure or support elements 8, the construction of which will be explained more fully hereinafter in conjunction with FIGS. 3 and 4. According to the arrangement shown by way of example in FIG. 1, these pressure elements 8 form three groups, each of which has infed thereto hydraulic pressure fluid medium by means of a respective channel or duct 10, 11 and 12 provided in the roll support 1. Although with the exemplary showing of FIG. 1 there has been shown connected one respective pressure or support element 8 with each of the channels or ducts 10 and 11 and two such pressure elements 8 with the channel or duct 12, it should be understood, however, that each group can contain a larger number of pressure or support elements 8. Connection bores 13 lead from the channels or ducts 10, 11 and 12 to the individual pressure elements 8.

Now as best seen by referring to FIG. 2, the pressure or support elements 8 are arranged in the intermediate space or gap 14 between the inner surface 15 of the roll shell 5 and the outer surface 16 of the roll support or core 1.

Figure 4:
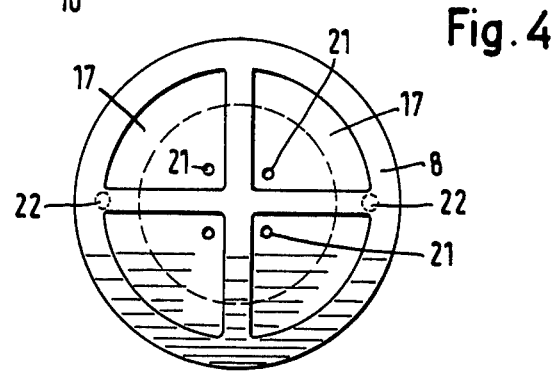
FIG. 4 is a top plan view of a pressure or support element used in the arrangement of FIG. 3.

As shown in FIGS. 3 and 4, each of the pressure or support elements of FIGS. 1 and 2 has four hydrostatic bearing pockets 17. According to the illustration of FIG. 3, at the underside the pressure element 8 is provided with a recess 18 in which there is located a lip seal 20 or equivalent structure. The bearing pockets 17 are flow connected by throttle bores or channels 21 with the recess 18. As also evident by referring to FIG. 3, the pressure or support element 8 is positionally fixed at the roll support 1 by two pins 22 or equivalent fixation means, which are secured in the roll support 1 and engage into appropriately configured recesses 23 of the related pressure or support element 8.

During operation, a hydraulic pressure fluid medium, such as typically oil, is supplied at an appropriate pressure through the channel or duct 10 and the bore 13 to the pressure or support element 8 of FIGS. 3 and 4. The pressurized fluid medium is effective within the recess 18 and forces the pressure element 8 against the inner surface 15 of the roll shell 5. At the same time the pressurized fluid medium flows through the throttle bores 21 into the bearing pockets 17 where it is effective by means of its pressure against the inner surface 15 of the roll shell 5. The bearing pockets 17 have a larger hydraulically effective surface than the recess 18. Consequently, there is afforded hydrostatic lubrication with an accurately determinable gap thickness which, additionally, is independent of whether the roll shell 5 is moving or stationary. This hydrostatic lubrication effect has been described in greater detail in the aforementioned U.S. Pat. No. 3,802,044 to which reference may be had.

Figure 5:
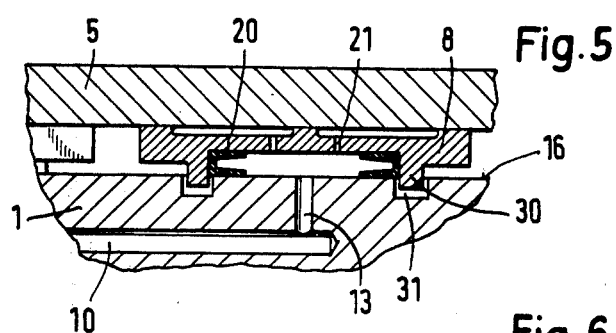
FIG. 5 is a section, corresponding to the showing of FIG. 3, of an alternative construction of pressure or support element.
Figure 6:
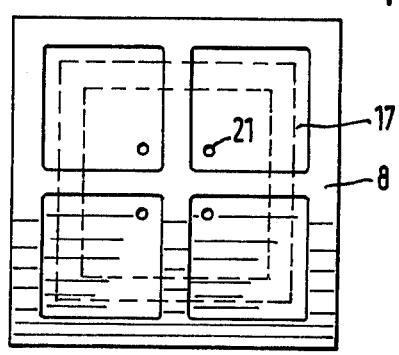
FIG.6 is a top plan view, corresponding to the showing of FIG. 4, of the embodiment of FIG. 5.

The pressure or support element 8, shown in the modified embodiment of FIGS.5 and 6, merely differs from the pressure or support element 8 of FIGS. 3 and 4, in that here the same has a projecting rib or protuberance 30 or equivalent structure against which bears the seal 20 and which engages with play or clearance in a groove or channel 31 provided at the outer surface 16 of the roll support 1. Additionally, with this variant construction, the pressure or support element 8 is not of circular configuration in plan view, rather is square or quadrilateral in shape, as clearly evident by referring to FIG.6. Also, in this case the seal 20 has a corresponding polygonal shape.

With the construction according to FIGS. 5 and 6, there is afforded the possibility of larger displacement strokes of the pressure element 8 in relation to the roll support 1. The lip seal 20 remains in bearing engagement with the protruding rib or lip means 30.

Continuing, in FIG. 7 there is shown an elongated pressure or support element which can replace a number of adjacently situated, individual pressure or support elements of the type shown previously, and specifically, equipped with two rows of hydrostatic bearing pockets 17. A seal 20, which for instance has the circular shape of the seal 20 of FIGS. 3 and 4, is disposed below each pair of pockets 17. Each of the pockets 17 is connected by means of a throttle bore or channel 21 with the chamber or space around which extends the seal 20. These seals 20 can be received in recesses 18 in the same manner as for the embodiment of FIGS. 3 and 4.

While with the exemplary embodiment of FIGS. 1 and 2, the pressure or support elements 8 bear upon a substantially cylindrical outer surface 16 of the roll support 1, with the further possible construction of roll support 1, as shown in FIG. 8, this roll support 1 has an outer surface 16 which is flattened or beveled by a planar surface or flat 16'. In this case, the pressure element 8 is constructed in the same manner as in the previous embodiments, except that the surface 40 thereof which cooperates with the roll support 1 is flat or planar and not cylindrical.

Finally, it is to be understood that various features of any of the described embodiments may be incorporated into other of the embodiments herein disclosed, as will readily suggest itself to those skilled in the art. For instance, the modification shown in FIG. 8 could also be applied to the constructions described with reference to FIGS. 1 to 7.

While there are shown and described present preferred embodiments of the invention, it is to be distinctly understood that the invention is not limited thereto, but may be otherwise variously embodied and practiced within the scope of the following claims. Accordingly,

What I claim is:

1. A controlled deflection roll comprising:
    a stationary roll support;
    a substantially tubular-shaped roll shell;
    means for mounting said substantially tubular-shaped roll shell to be rotatable about said stationary roll support;
    at least one hydrostatic pressure element arranged between said roll support and said roll shell;
    said hydrostatic pressure element being guided at said roll support and having a contact surface against which slidingly bears an inner surface of said roll shell;
    a hydraulic pressure chamber arranged between the roll support and said pressure element for the infeed of a hydraulic pressurized fluid medium; said contact surface of said pressure element being provided with a number of hydrostatic bearing pockets;
    throttle channel means for connecting said hydrostatic bearing pockets with said pressure chamber;
    said pressure element constituting a substantially plate-like pressure element arranged in an intermediate space between the inner surface of said roll shell and an outer surface of said roll support;
    seal means retained at the pressure element; and
    said pressure chamber being bounded by the outer surface of said roll support, a surface of the pressure element confronting the outer surface of said roll support and said seal means retained at the pressure element.

2. The controlled deflection roll as defined in claim 1, wherein:
    said roll support is provided with an essentially cylindrical outer surface, at the location of the pressure element; and
    said essentially cylindrical outer surface extending substantially coaxially with respect to said roll shell.

3. The controlled deflection roll as defined in claim 1, wherein:
    said roll support has a substantially flat outer surface at the location of the pressure element.

4. The controlled deflection roll as defined in claim 1, wherein:
    said seal means comprises a lip seal;
    said pressure element having recess means; and
    said lip seal being arranged in said recess means of said pressure element.

5. The controlled deflection roll as defined in claim 1, further including:
    at least two fixation means for retaining said pressure element of said roll support;
    said fixation means being secured to said roll support; and
    said pressure element having recess means for receiving with play said fixation means.

6. The controlled deflection roll as defined in claim 5, wherein:
    each of said two fixation means comprises a pin.

7. The controlled deflection roll as defined in claim 1, wherein:
    said pressure element embodies protruding rib means confronting said roll support;
    said seal means bearing against said protruding rib means; and
    the outer surface of said roll support being provided with groove means into which engages said protruding rib means.

8. The controlled deflection roll as defined in claim 1, wherein:
    said pressure element has the form of an elongate strip extending in axial direction of said roll support; and
    a plurality of said seal means provided for said elongate strip for bounding mutually separate pressure chambers from one another.

* * * * *